(12) United States Patent
Mulville

(10) Patent No.: US 11,340,138 B1
(45) Date of Patent: May 24, 2022

(54) TOOLING AUDIT PLATFORM

(71) Applicant: Paul Mulville, Clinton, NY (US)

(72) Inventor: Paul Mulville, Clinton, NY (US)

( * ) Notice: Subject to any disclaimer, the term of this patent is extended or adjusted under 35 U.S.C. 154(b) by 319 days.

(21) Appl. No.: 16/436,516

(22) Filed: Jun. 10, 2019

Related U.S. Application Data

(60) Provisional application No. 62/682,544, filed on Jun. 8, 2018.

(51) Int. Cl.
*G01M 13/00* (2019.01)
*H04L 67/01* (2022.01)

(52) U.S. Cl.
CPC .............. *G01M 13/00* (2013.01); *H04L 67/42* (2013.01)

(58) Field of Classification Search
CPC ..... G01M 13/00–13/045; G01M 15/00–15/14; H04L 67/00–67/42
See application file for complete search history.

(56) References Cited

U.S. PATENT DOCUMENTS

| | | | | |
|---|---|---|---|---|
| 6,339,737 | B1 * | 1/2002 | Yoshimura | G07C 5/085 701/33.4 |
| 6,438,445 | B1 * | 8/2002 | Yoshida | G05B 19/40937 700/173 |
| 2003/0009311 | A1 * | 1/2003 | Ushiku | F04D 19/04 702/184 |
| 2009/0259507 | A1 * | 10/2009 | Miwa | G06Q 10/20 705/7.24 |
| 2013/0090856 | A1 * | 4/2013 | Godager | G06F 15/00 702/11 |
| 2016/0371588 | A1 * | 12/2016 | Richardson | G06N 20/00 |
| 2017/0362928 | A1 * | 12/2017 | Kang | G05B 19/048 |
| 2020/0284694 | A1 * | 9/2020 | Scott | G01M 7/00 |
| 2020/0325766 | A1 * | 10/2020 | Gupta | G01R 31/34 |
| 2021/0180532 | A1 * | 6/2021 | Sen | B01D 29/606 |

OTHER PUBLICATIONS

Kanawaday, "Machine Learning for Predictive Maintenance of Industrial Machines using IoT Sensor Data" 2017, IEEE, pp. 87-90 (Year: 2017).*

Singh et al. "Predictive Reliability Mining for Early Warnings in Populations of Connected Machines", 2015, IEEE, pp. 1-10 (Year: 2015).*

* cited by examiner

*Primary Examiner* — Clayton R Williams
(74) *Attorney, Agent, or Firm* — Waller Lansden Dortch & Davis, LLP; Matthew C. Cox

(57) ABSTRACT

A system is disclosed. The system may include a data-gathering apparatus disposed on a tooling. The data-gathering apparatus may include a sensor configured to detect one or more events produced by the tooling, and a data store configured to store event data. The event data may be based on the one or more detected events. The system may include a client apparatus configured to receive user input, communicate the user input to an external device, receive data from the external device, and display at least a portion of the received data on a display of the client apparatus. The system may include a server in data communication with the data-gathering apparatus and the client apparatus. The server may be configured to receive the event data, process the event data, and send at least a portion of the processed data to the client apparatus.

10 Claims, 6 Drawing Sheets

Tool Information

| Tool Number: | 0001 | | 2015 | 2016 | 2017 | 2018 | 2019 | 2020 |
|---|---|---|---|---|---|---|---|---|
| Asset Number | 693EB4567A2V | | | Warranty | | Maintenance | | Risk |
| Tool Type: | 16 Cavity Hot Runner Mold | Total Cycle Count: | 3,489,221 | | | | | |
| Tool Status: | Online | Warranty: | 1,000,000 | | | | | |
| Location: | Facility 3; Chicago, IL | Placed in Service: | March 25, 2015 | | | | | |
| GPS Coordinates: | 41.8525° N, 87.6298° W | Current Value: | $2,450 | 92% depreciated | | | | |
| | | Battery Life: | 58% | | | | | |

Figures

- Figure 1
- Figure 2
- Add new Figure . . .

Change Overs

- Add new Change Over . . .

Maintenance Log

| Cycle Count | Reason |
|---|---|
| 2,789,233 | Broken part |
| 1,000,000 | Level 2 PM. |

Cycle Count Adjustments

| Adjustment | Reason |
|---|---|
| -15 | Testing |

FIG. 4

TOOLING AUDIT PLATFORM

CROSS-REFERENCES TO RELATED APPLICATIONS

This application claims priority to U.S. Provisional Patent Application No. 62/682,544, filed Jun. 8, 2018, entitled "TOOLING AUDIT PLATFORM," which is hereby incorporated by reference in its entireties A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present disclosure relates generally to auditing tooling and more particularly to a platform for auditing tooling. A manufacturing company may have a large inventory of tooling. This tooling may be in a variety of locations, may be of many different types, may have been purchased at a different time, or may be used different amounts. Information about the tooling and its use may not be readily available. What is needed is a way to have such information easily available to multiple different people in a company. What is also needed is a way to use this information to calculate predictive analytics about the one or more machines.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure may include a system. The system may include a data-gathering apparatus. The data gathering apparatus, or portions of the data gathering apparatus, may be disposed on tooling. The data-gathering apparatus may include a sensor. The sensor may be configured to detect one or more events produced by the tooling. The data-gathering apparatus may include a data store. The data store may be configured to store event data. The event data may be based on the one or more detected events.

The system may include a client apparatus. The client apparatus may be configured to receive user input. The client apparatus may be configured to communicate the user input to an external device. The client apparatus may be configured to receive data from the external device. The client apparatus may be configured to display at least a portion of the received data on a display of the client apparatus.

The system may include a server. The server may be in data communication with the data-gathering apparatus or the client apparatus. The server may be configured to receive the event data. The server may be configured to process the event data. Processing the event data may include the server generating one or more predictive analytics. The predictive analytics may be based on the event data. The server may be configured to send at least a portion of the predictive analytics to the client apparatus.

Another aspect of the disclosure may include a method. The method may include a computer-implemented method. The method may include receiving, at a server, event data from a data-gathering apparatus disposed on tooling. The event data may be based on one or more events detected by a sensor of the data-gathering apparatus. The method may include receiving, at the server, tooling data from a tool record database. The tooling data may include data about the tooling that the data-gathering apparatus is disposed on. The method may include generating, via the server, predictive analytics. The predictive analytics may be based on the received event data and tooling data.

Another aspect of the disclosure may include a data-gathering apparatus. The data-gathering apparatus may include at least one sensor. The at least one sensor may be configured to detect one or more events of a tooling. The data-gathering apparatus may include a processor. The data gathering apparatus may include a data store. The data store may be configured to store event data. The event data may be based on the one or more detected events. The data-gathering apparatus may include a data input/output (I/O) interface. The I/O interface may be configured to send the event data to a server.

Numerous other objects, advantages and features of the present disclosure will be readily apparent to those of skill in the art upon a review of the following drawings and description of a preferred embodiment.

BRIEF DESCRIPTION OF THE DRAWINGS

FIG. 4 is a schematic block diagram depicting one embodiment of a display for a tooling audit platform.

DETAILED DESCRIPTION

Figure 1:
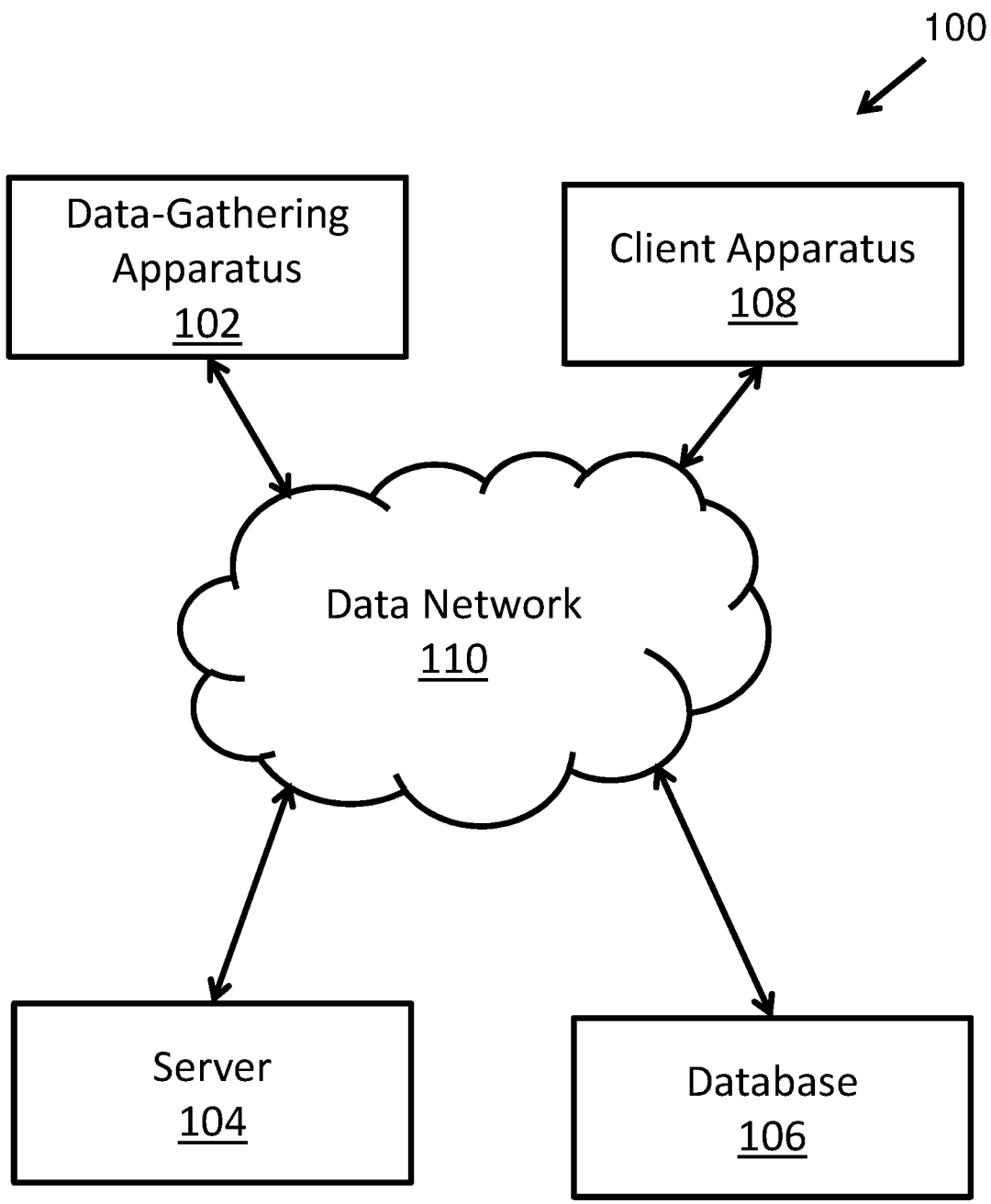
FIG. 1 is a schematic block diagram depicting one embodiment of a system for a tooling audit platform.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc.

refer to the apparatus when in the orientation shown in the drawing. A person of skill in the art will recognize that the apparatus can assume different orientations when in use.

Reference throughout this specification to "one embodiment," "an embodiment," "another embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

The schematic flow chart diagrams included herein are generally set forth as logical flow chart diagrams. As such, the depicted order and labeled steps are indicative of one embodiment of the presented method. Other steps and methods may be conceived that may be equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. One skilled in the relevant art will recognize, however, that the disclosure may be practiced without one or more of the specific details, or with other methods, components, materials, and so forth. In other instances, well-known structures, materials, or operations are not shown or described in detail to avoid obscuring aspects of the disclosure.

These features and advantages of the embodiments will become more fully apparent from the following description and appended claims, or may be learned by the practice of embodiments as set forth hereinafter. As will be appreciated by one skilled in the art, aspects of the present disclosure may be embodied as a system, method, and/or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having program code embodied thereon.

In some embodiments, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

FIG. 1 depicts one embodiment of a system 100 for a tooling audit platform. The system 100 may include a data-gathering apparatus 102. The system 100 may include a server 104. The system 100 may include a database 106. The system 100 may include a client apparatus 108. The system 100 may include a data network 110. The data-gathering apparatus 102, the server 104, the database 106, and the client apparatus 108 may each be in data communication with one or more of the other features of the system 100. In some embodiments, these features may be in data communication through the data network 110.

As a brief overview of one embodiment, the data-gathering apparatus 102 may be coupled to a tooling. The tooling may generate one or more events. The data-gathering apparatus 102 may include a sensor. The sensor may detect one or more of these events. The data-gathering apparatus 102 may include a data store. The data store may store event data from the sensor. The event data may be based on the detected event.

The server 104 may include a computing device. The server 104 may receive the event data from the data-gathering apparatus 102. The server 104 may receive other data from the database 106. The server 104 may process the event data or the database data. The server 104 may generate one or more predictive analytics based on the data from the data-gathering apparatus 102 or the database 106. The server 104 may send the predictive analytics to the client apparatus 108.

The client apparatus 108 may include a computing device. The client apparatus 108 may receive user input, communicate the user input to an external device such as the server 104, receive data from an external device, or display data. In response to the functionality of the system 100, a user of the system 100 may receive real-time data from the tooling and the system 100 may present predictive analytics about the tooling to the user based on data gathered from the tooling. The predictive analytics may enable the user to make better decisions regarding the tooling.

The data network 110 may include a medium or architecture capable of facilitating communication or data transfer. Examples of the data network 110 may include an intranet, a wireless local area network (WLAN), a Wide Area Network (WAN), a Local Area Network (LAN), a Personal Area Network (PAN), the Internet, Power Line Communications (PLC), a cellular network (which may include wireless network technologies such as 4G or 5G), or the like. The data network 110 may facilitate communication or data transfer using wireless or wired connections. In one embodiment, the network 110 may facilitate communication between the data-gathering apparatus 102 and the server 104, or the server 104 and the client apparatus 108.

Figure 2:
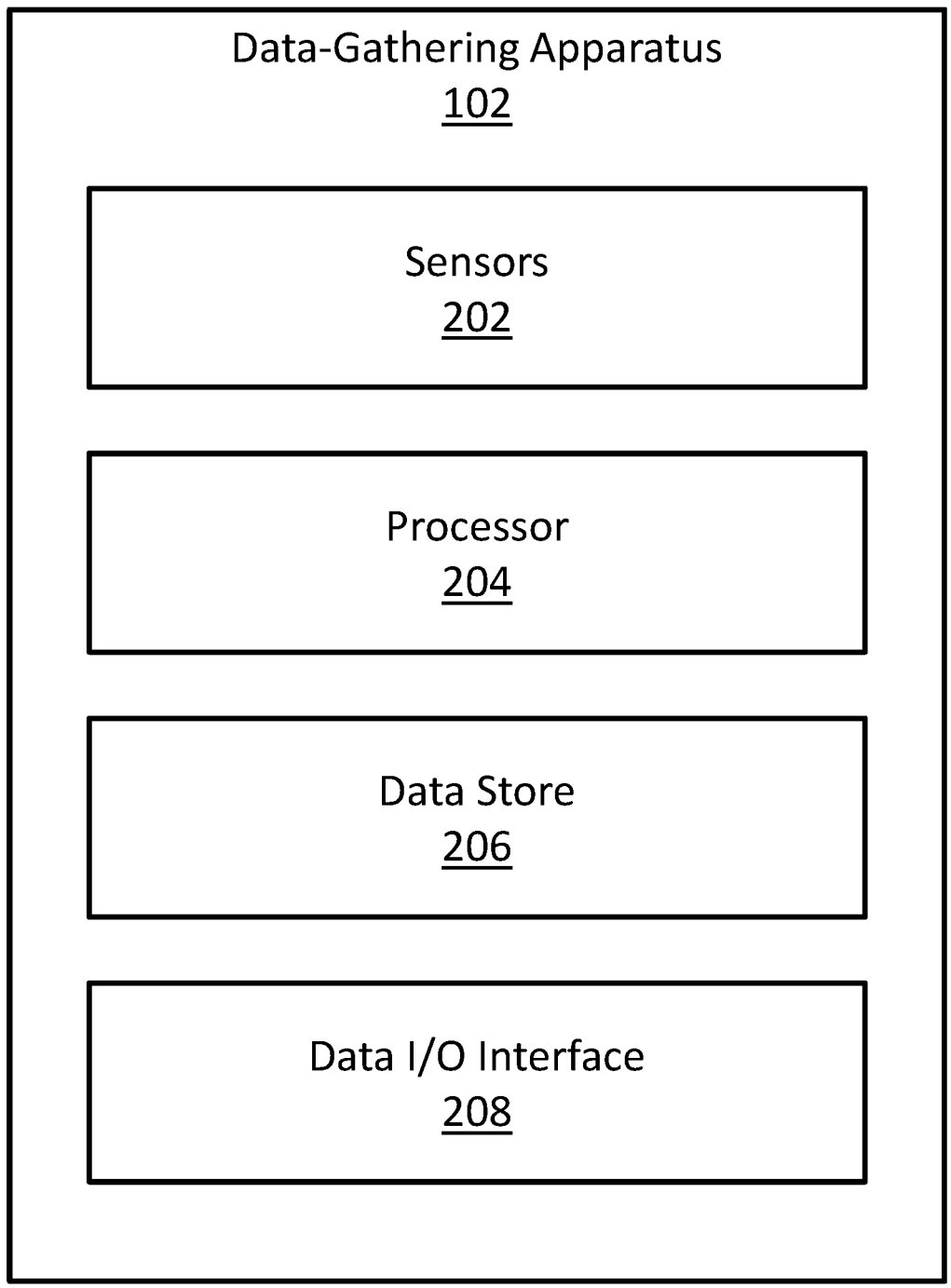
FIG. 2 is a schematic block diagram depicting one embodiment of a data-gathering apparatus.

FIG. 2 depicts one embodiment of a data-gathering apparatus 102. The data-gathering apparatus 102 may couple to tooling. The tooling may include tooling that operates in a cycle-driven or reciprocal system. Tooling may include an injection mold, blow mold, progressive die, or die stamping tooling, or the like. Tooling may include molds for plastics, or other press tooling for stamping, blanking, piercing, bending, forming, forging, or trimming tooling, or the like. In one embodiment, the data-gathering apparatus 102 may be retrofitted onto the tooling. In another embodiment, the data-gathering apparatus 102 may be integrated into the tooling.

The data-gathering apparatus 102 may include one or more sensors 202. In some embodiments, the sensors 202 may detect one or more events involving the tooling. In one embodiment, the sensors 202 may detect a cycle of the tooling. A cycle of the tooling may include a repeated action of the machine such as coupling two or more parts together, placing a part of the produced product, or the like. For example, a sensor of the sensors 202 may include a pressure sensor, and the pressure sensor may detect an arm of the tooling pressing down on the sensor. The sensors 202 may include electrical sensors or a data interface that may receive a signal from the tooling. The sensors 202 may include a location sensor, such as a global positioning system (GPS). The sensors 202 may include gyroscopes, lasers, pressure sensors, visual sensors, or other sensing equipment as are known in the art.

The sensors 202 may detect, sense, gather, or the like a variety of data. The sensors 202 may detect motion-related events of the tooling (e.g. the cycles of the tooling, an active or inactive time period of the machine). The sensors 202 may detect the location of the tooling, the current date and time, the battery life of the data-gathering device 102 (e.g. in response to the data-gathering device 102 running on battery power). The sensors 202 may detect an error or fault associated with the tooling. The sensors may detect a variety of other events.

The data-gathering apparatus 102 may include a processor 204. The processor 204 may include circuitry such as a processing core, memory, an embedded system, or the like. The processor may include software. The software may include computer-readable program instructions, as described above. The processor 204 may use the program instructions to carry out one or more functions of the data-gathering apparatus 102. The processor 204 may run the sensors 202, the data store 206, or the data I/O interface 208 described below.

The data-gathering apparatus 102 may include a data store 206. The data store 206 may include long-term data storage such as flash memory, a hard-disk drive, solid-state drive, or the like. The data store 206 may receive data from the sensors 202 and store the data. The processor 204 may format the data from the sensors 202 for storage in the data store 206. The data that may be stored in the data store 206 are described below.

The data-gathering apparatus 102 may include a data input/output (I/O) interface 208. The data I/O interface 208 may transmit data from the data-gathering apparatus 102 to the server 104. The data I/O interface 208 may receive data, instructions, or the like from the server 104. The data I/O interface 208 may communicate via the data network 110 to send or receive data. The data I/O interface 208 may include a wired network adapter (such as an Ethernet port), a wireless network adapter (such as a WI-FI adapter), or the like. The data I/O interface 208 may include a transmitter/receiver for radio frequency identification (RFID), near field communication (NFC), or the like.

Returning to FIG. 1, the server 104 may include a computing device that capable of requesting or receiving data via the data network 110. The server 104 may include a computing device capable of storing or processing data. Examples of the server 104 may include an application server, a database server, or the like. The server may include software. The software may receive data from the data-gathering apparatus 102 or the database 106, may process the data, and may send the processed data to the client apparatus 108.

In one embodiment, the server 104 may provide predictive analytics about a tooling to which the data-gathering apparatus 102 is coupled. The predictive analytics may be based on the data from the data-gathering apparatus 102 and data from the database 106. The server 106 may use the data from the data-gathering apparatus 102 and the database 106 to generate, based on the software of the server 104, the predictive analytics.

The database 106 may include a single database or computing device, or a plurality of databases or computing devices. In some embodiments, the database 106 may be part of the server 104. For example, the software of the server 104 may include the database 106. In one embodiment, the database 106 may include a computing device that is separate from the server 104. The server 104 and the database 106 may communicate via the data network 110. The database 106 may store data about the tooling. In one embodiment, data about the tooling stored in the server 106 may include a serial number, a tool identification number, a cycle count history, a maintenance log, or the like. Other data that the database 106 may include are described below.

As mentioned above, the data-gathering apparatus 102 and the database 106 may store a variety of data. The data may include data about the tooling to which the data-gathering apparatus 102 may be coupled. The data may include data from a variety of sources. For example, the data may come the sensors 202 of the data-gathering apparatus 102, input from a user, input from a computing device (e.g. over the data network 110), the server 104 or the client apparatus 108, or the like. The server 104 may process this data as input data to generate one or more predictive analytics as output data. Below are listed some of the predictive analytics categories, their input data, and their output data. It should be noted that each list of input data and each list of output data may include other data that may be helpful in generating the predictive analytics. Data may be expressed as any appropriate alphanumeric, symbol, or digital value.

| Predictive Analytic | Input(s) | Output(s) |
|---|---|---|
| Key Performance Indicator (KPI) | cycle count; maintenance history; number of breakdowns of the tooling; cavity data of the tooling; warranty information; tool classification of the tooling | sustainability; predicted tool life; risk predictive index; predicted number of breakdowns; maintenance turns completed; |
| useful tool life predictor | cycle count; maintenance history; number of breakdowns; warranty data; cavity data; tool classification | percent or time remaining; risk zone indicator |

-continued

| Predictive Analytic | Input(s) | Output(s) |
|---|---|---|
| current tooling condition | cycle count; maintenance history; number of breakdowns; warranty information; cavity information; tool classification; useful tool life predictor | risk index based on algorithms |
| Product Lifecycle Indices | corporate sales entries computation with cycle counts; expected life of the tool; classification of the tooling; cavity data of the tooling; warranty information | sustainability; predicted life of the tooling; risk index; predictive index |
| Depreciation Scale | asset value of the tooling; year of manufacture; depreciation rate; | depreciation schedule |
| Real-time Tooling Audit Information | cycle count; location; disposition; tooling's relationship with or dependence on other tooling; tooling parts' relationship with or dependence on other parts of the tooling | hardware location; parts of the tooling or other tooling in the risk zone |
| Maintenance Schedule | tooling's manual; cycle count; tooling's use history; serviced | one or more dates, cycle counts, or the like for when the tooling should be |
| global inventory snapshot | a status of one or more tooling (including all tooling tracked by the system) | a graphical representation of the statuses of the tooling |

Data Definitions

Asset value. This may include the value of the tooling. The value of the tooling may come from user entry, a database, accounting data, or the like.

Cavity data of the tooling. This may include the number of cavities, information about each cavity, or the like.

Classification of the tooling. This may include a range of industry standard classes for tooling or the type of the machine. Examples may include injection mold tooling, progressive die tooling, or the like.

Corporate sales entries computation with cycle counts.

Country of origin. This may include the country where the tooling was manufactured.

Current tooling condition. This may include a description of the tooling's condition. The description may include values such as "Good," "Fair" (requires minor repairs, upkeep, or the like), "Poor" (requires major work, refurbishment, or the like), or "High Risk" (likely to fail).

Cycle count. This may include the number of times the tooling has performed a cycle, as described above. Cycle count could include total cycle count (i.e., the total number of cycles the tooling has performed in its life) or a reduced cycle count, such as the number of cycles while owned by the current owner, the number of cycles performed in a certain time period or since a certain event, or the like.

Depreciation rate. A metric that shows how much an asset depreciates over time. The rate may come from user entry, a database, accounting data, or the like. May be used to generate a depreciation schedule.

Disposition/Status. This may include one or more values indicating a status of the machine. The values may include "Running/Active", "Broken," "Under Repair," "Under Modification," "Obsolete," "In Transit," or the like.

Tool Life. This may include an expected life of the tooling. The expected life may include a value from the manufacturer of the tooling, the warranty, a predictive analytic (e.g. the predicted life of the tooling, below), or the like.

Global tooling inventory snapshot. This may include a graphical representation of the data about the tooling inventory or at least a portion of that inventory. In some embodiments, the graphical representation may include data about all of the tooling tracked by the system 100. The graphical representation may be presented to a user via the client apparatus 108. The data of the tooling may be grouped by a status value, location, or ordered by ID number or the like.

Key performance indicator (KPI). This may include one or more predictive analytics or other data. The analytics or other data may be displayed to the user in a way to help the user make future decisions about the tooling. The predictive analytic or other data may be displayed as a chart, graph, or the like.

Location. The location may include one or more pieces of data about a location attribute of the tooling. The data may include global positioning system (GPS) data, RFID data, text data from user input, or the like. The data may include geographic coordinates (e.g. latitude and longitude), an address, a location within a facility (e.g. floor number, room number, or the like), or other location data. hardware location.

Tooling manual. A tooling manual may include a suggested maintenance schedule, one or more diagrams of the machine, expected life of the machine according to the manufacturer, or the like. In some embodiments, this information, at least in part, may come from a bill of materials or the like, in response to the tooling not including a manual from the manufacturer.

Maintenance history/Maintenance turns completed. This may include one or more entries with data about an event when the tooling broke down, when the tooling was serviced, when a scheduled maintenance was missed, or the like. An entry may include a cycle count at the time of maintenance, the date of the maintenance, the reason for the maintenance, or the like. An entry may be entered manually or may be automatically generated in response to an event.

Maintenance schedule. The maintenance schedule may include one or criteria indicating when the next maintenance should be performed on the tooling. It may include one or more entries. An entry may include one or more dates, cycle counts, or the like for when the tooling should be serviced. An entry may be entered manually or may be automatically created in response to an event.

Number of breakdowns. This may include a number of times the tooling has broken down, experienced unplanned reductions in performance, or the like (all referred to herein as a "breakdown"). The number of breakdowns may include a maintenance log. The entries of the maintenance log may include the date of a breakdown, the cycle count at the time of the breakdown, the reason for the breakdown, or the like. An entry may be entered manually or may be automatically generated in response to an event.

Parts of the tooling or other tooling in the risk zone. This may include a message to a user that the tooling or a part of the tooling is in the risk zone. Tooling in the risk zone may include tooling that has gone beyond both the warranty and the maintenance period.

Predicted life of the tooling. The predicted life of the tooling may include a length of time, a number of cycles, or the like that the tooling is expected to function.

Predicted number of breakdowns. The number of breakdowns expected within a certain period of the tooling. This could be expressed in number of breakdowns in a time period (e.g. 3 over the next year), for a certain cycle count (e.g. 3 over the next 1,000,000 cycles), or the like.

Predictive index. This may include an index predicting one or more events, statuses, or the like of the tooling. A predictive index may include tool life remaining, a risk zone index, or the like.

Tooling relationship with or dependence on other tooling/ Tooling parts' relationship with or dependence on other parts of the tooling. This may include information indicating whether the tooling (or a part of the tooling) depends on or otherwise relates to another tooling (or another part of the tooling). It may include a dependency chart, a schematic diagram, or the like.

Product lifecycle indices. This may include one or more indices of the tooling life relative to product life. This may include dynamic data (such as cycle-driven data) that may combine with fixed, onboarding data.

Real-time tooling audit information. This may include information about tooling that is received in real time. The information may come from the data-gathering apparatus 102. This information may include tooling physical location, current cycle count, tooling in the risk zone, or the like.

Risk index. The risk index may include a range of possible values and a classification corresponding to one or more values. For example, the range may include 0 to 100. The classifications may include low risk, medium risk, and high risk. Low risk may correspond to values 0-40, medium risk may correspond to values 41-60, and high risk may correspond to values 61-100.

Sustainability. This may include an output measure. The output measure may combine one or more pieces of data such as tooling condition, number of cycles, risk index, and maintenance inputs.

Use history. The tooling's use history may include data about when the tooling is used, how often it is used, or the like.

Useful tool life remaining/predictor. The useful tool life remaining may include a measurement of how much longer the tooling may last. It may be expressed as a length of time (e.g. the tooling will likely last 15 more months), a percentage (e.g. the tooling will likely last 15 more months and its total expected life is 120 months, thus the percentage is 12.5%), a number of cycles, or the like.

Warranty information. The warranty information may include the start and end data of the warranty period, the number of cycles the warranty covers, or the like.

Year of manufacture. This may include the year the tooling was manufactured, sold by the manufacturer, or the like.

Other data that the input or output data may include may include a tool ID number. The tool ID number may include a unique number assigned to the tooling by the owner. The data may include a serial number. The serial number may include a number assigned to the machine by the manufacturer of the tooling. The data may include an ID number of the data-gathering apparatus 102 coupled to the tooling. The data may include other data a user of the system 100 may wish to know.

The client apparatus 108 may include a computing device such as a laptop computer, a desktop computer, a tablet computer, or the like. The client apparatus 108 may include software. The software may allow the client apparatus 108 to communicate with the server 104. The software may send data to the server 104, such as requests for data about tooling. The software may display data received from the server 104. In one embodiment, the client apparatus 108 may access the software from the server 104 using a software as a service (SaaS) architecture.

In some embodiment, the client apparatus 108 may upload documents, data, or the like to the server 104 or the database 106. For example, in one embodiment, the client apparatus 108 may upload one or more computer-assisted drawing (CAD) files, a warranty document, a tooling manual, or the like to the server 104.

Figure 3:
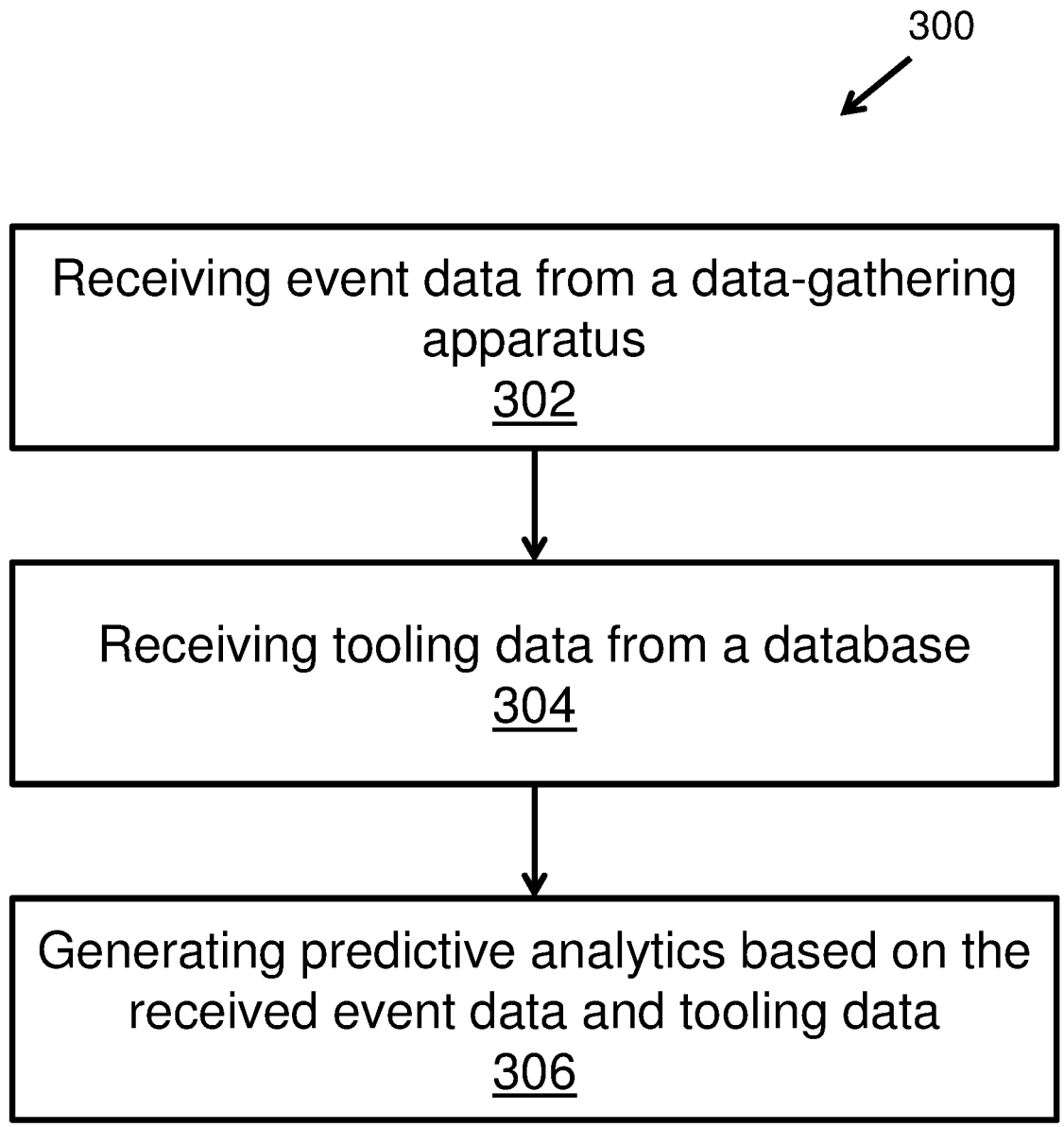
FIG. 3 is a schematic flowchart depicting one embodiment of a method for a tooling audit platform.

FIG. 3 depicts one embodiment of a method 300 for a tooling audit platform. The method 300 may include receiving 302 data from a data-gathering apparatus coupled to a tooling. The method 300 may include receiving 304 data from a database. The data may include data about the tooling. The method 300 may include processing 306 the data from the data-gathering apparatus and the data from the database. The method 300 may include generating 308 predictive analytics based on the processed data.

In one embodiment, the method 300 may include receiving data from a data-gathering apparatus coupled to the tooling. The data-gathering apparatus may include the data-gathering apparatus 102. The server 104 may receive the data. In one embodiment, the server 104 may receive the data from the data-gathering apparatus 102 in response to sending a request to the data-gathering apparatus 102 for the data. In some embodiments, the data-gathering apparatus 102 may send the data to the server at a regular time interval.

In one embodiment, the method 300 may include receiving data from a database. The database may include the database 106. The server 104 may receive the data. In some embodiments, the server 104 may receive data from the database 106 in response to sending a request to the database. For example, the server 104 may have received a cycle count from a data-gathering apparatus 102 coupled to the tooling, and the tooling may include the serial number "0001." The server 104 may request data about the tooling "0001" from the database 106. In response, the database 106 may send the server 104 the maintenance history, the warranty information, and the tool type of the "0001" machine.

The method 300 may include generating 306 a predictive analytic based on the received data. The received data may include the data from the data-gathering apparatus and the database. In one embodiment, the server 104 may generate the predictive analytics. Generating 306 the predictive analytics may include processing the received data. Generating 306 the predictive analytics may include calculating information about the tooling based on the data from the data-gathering apparatus 102 and the database 106.

For example, generating a predicted machine life may include processing 306 the data from the data-gathering apparatus 102 and the database 106. The server 104 may use the cycle count received from the data-gathering apparatus 102, the maintenance history, the number of breakdowns, the warranty information, and the machine type received from the database to calculate a predicted machine life. In one embodiment, the server 104 may generate the predicted machine life without having to inspect the tooling, read a cycle counter, or consult maintenance logs, warranty documents, or machine manuals.

In one embodiment, the method 300 may include presenting data to a user. The data may include data based on the data processed by the server 104. The data may include predictive analytics about the tooling. In one embodiment, the client apparatus 108 may present the data to the user.

The data may be useful to several different types of users. For example, a person in the accounting department of a company that owns a tooling with a coupled data-gathering apparatus 102 may wish to know the current value of the tooling or the tooling's predicted life. These values may influence the accounting of the company, and the more accurate these values, the better financial decisions the company can make. A person on the maintenance team of the company may wish to know the location of the tooling, the cycle count, the maintenance history of the tooling, and the suggested maintenance practices for the tooling. These values may influence the maintenance decisions of the company, and the more accurate these values, the better maintenance decisions the company can make. The data may influence a company when deciding when to purchase new tooling. The more accurate the data, the better purchase decisions the company can make.

FIG. 4 depicts one embodiment of a display 400 for a tooling audit platform. In one embodiment, the client apparatus 108 may include the display 400. In some embodiments, the display 400 may include one or more pieces of data about the tooling. For example, the display 400 may show the tool number, the cycle count, the location, or the like. In one embodiment, the display 400 may show one or more predictive analytics. For example, the display 400 may show a risk index. In another embodiment, the display 400 may show other data such as figures of the tooling, a maintenance log, or the like. One or more of the pieces of data may include data pulled from the database 106. The data may be in a variety of formats. For example, the figures may include CAD files, the maintenance log may include a portable data format (PDF) file, or the like. A user may upload one or more of these files from the display 400 and the files may be inserted into the database 106 or the like.

Figure 5A:
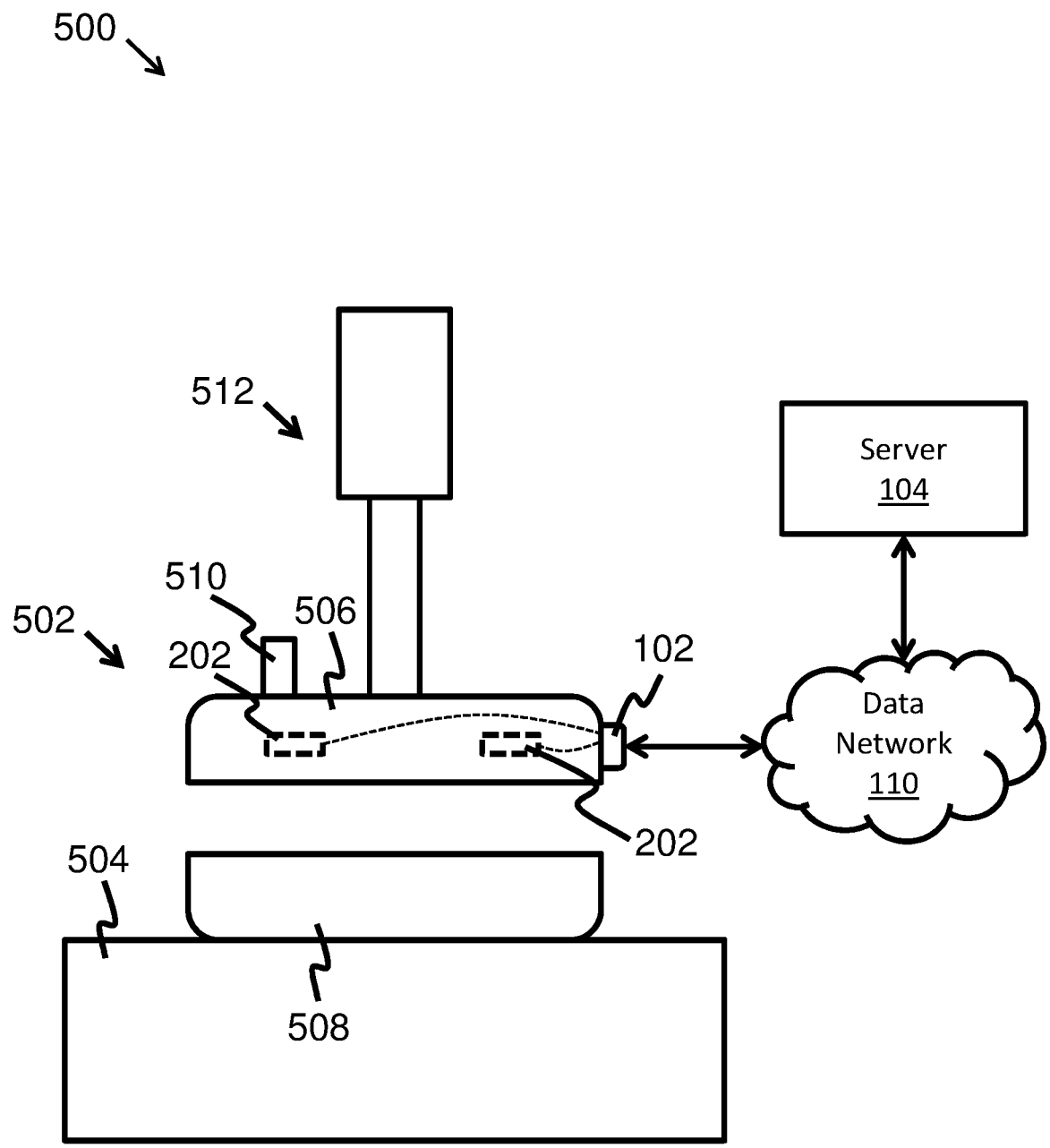
FIG. 5A is a schematic block diagram depicting one embodiment of a system for a tooling audit platform.

FIG. 5A depicts one embodiment of a system 500. The system 500 may include a system for a tooling audit platform. The system 500 may include tooling 502. The tooling 502 may be disposed on a surface 504. The tooling 502 may include a first plate 506. The tooling 502 may include a second plate 508. The tooling 502 may include an injection tubing 510. The system 500 may include press machinery 512. The system 500 may include one or more components of the system 100, such as the data-gathering apparatus 102, the server 104, or the data network 110. The system 100 may include one or more components of the data-gathering apparatus 200 such as the sensors 202.

In one embodiment, the tooling 502 may include an injection mold tooling. The press machinery 512 may include a hydraulic press. The press machinery 512 may press the first plate 506 and the second plate 508 together as part of a cycle of the tooling 502. In some embodiments, the one or more sensors 202 may be disposed on the tooling 502. For example, the sensors 202 may include a temperature sensor or a pressure sensor disposed inside a cavity of the tooling 502. The sensors 202 may sense events produced by the tooling 502, as described above. The sensors 202 may connect to a housing of the data-gathering apparatus 102 via wires, as shown in FIG. 5A. In some embodiments, the sensors 202 may include a wireless interface and may communicate wirelessly with the data gathering apparatus 102 via wireless transmissions.

In one embodiment, the sensors 202 may communicate sensed data to the data-gathering apparatus 102, and the data gathering apparatus 102 may reformat or convert the received data and store the data in the data store 206 of the data-gathering apparatus 102. The sensors 202 may send the sensed data to the data-gathering apparatus 102 in a digital, analog, or other format.

In some embodiments, the data-gathering apparatus 102, as shown in FIG. 5A, may be disposed on the tooling 502. In some embodiments, the data-gathering apparatus 102 may include other sensors 202 disposed on other parts of the tooling. For example, a sensor 202 may be disposed inside a housing of the data-gathering apparatus 102. The data-gathering apparatus 102 may include a motion sensor disposed inside the housing to detect the motion of the first plate 506 moving downward to press on the second plate 508. The data-gathering apparatus 102 may send data to the server via the data network 110.

Figure 5B:
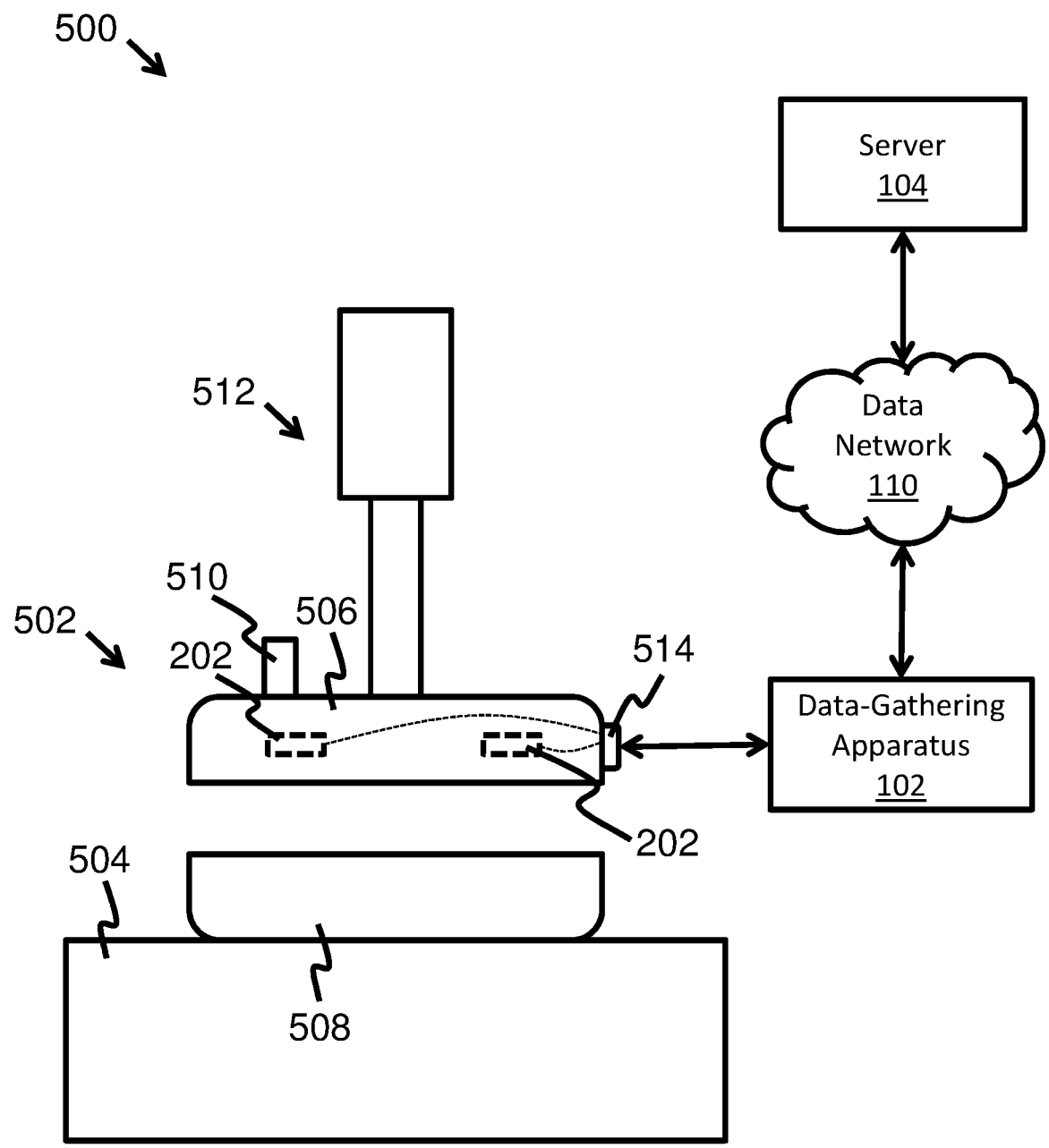
FIG. 5B is a schematic block diagram depicting one embodiment of a system for a tooling audit platform.

FIG. 5B depicts another embodiment of the system 500. In one embodiment, the system 500 may include a relay device 514. The relay device 514 may be disposed on the tooling 502. The data-gathering apparatus 102 may not be disposed on the tooling 502. The relay device 514 may receive data from the one or more sensors 202. The relay device 514 may relay the sensed data from the sensors 202 to the data-gathering apparatus 102. The data-gathering apparatus 102 may connect to the relay device 514 via a wired or wireless interface. The data-gathering apparatus 102 may receive analog, digital, electrical, or other types of signals from the relay device 514. The data-gathering apparatus 102 or the relay device 514 may reformat or convert the signals from the sensors 202.

Thus, although there have been described particular embodiments of the present invention of a new and useful tooling audit platform, it is not intended that such references be construed as limitations upon the scope of this invention.

What is claimed:

1. A system, comprising:
    a data-gathering apparatus, comprising
        a sensor disposed on a tooling, wherein the sensor is configured to detect one or more events produced by the tooling, and
        a data store configured to store event data, wherein the event data is based on the one or more detected events;
    a client apparatus configured to
        receive user input,
        communicate the user input to an external device,
        receive data from the external device, and
        display at least a portion of the received data on a display of the client apparatus; and
    a server in data communication with the data-gathering apparatus and the client apparatus, wherein the server is configured to
        receive the event data,
        process the event data to generate one or more predictive analytics based on the event data, and
        send at least a portion of the predictive analytics to the client apparatus;
    a tool record database in data communication with the server, wherein the tool record database is configured to store tooling data; and
    send the tooling data to the server,
        wherein the server being configured to process the event data to generate the one or more predictive analytics includes the server being configured to process the tooling data and the event data to generate the one or more predictive analytics, wherein the server being configured to process the tooling data and the event data comprises the server calculating the predictive analytics based on the tooling data and the event data,
wherein the tooling data includes
a maintenance history of the tooling, and
cavity data of the tooling;
the event data includes a cycle count; and
the predictive analytics include a predicted life remaining for the tooling.

2. The system of claim 1, wherein:
the sensor includes a motion sensor; and
the one or more events include one or more cycles of the tooling.

3. The system of claim 1, wherein:
the sensor includes a pressure sensor; and
the one or more events includes the tooling pressing down on a portion of the pressure sensor.

4. The system of claim 1, wherein:
the sensor includes an electrical sensor; and
the one or more events includes one or more error signals from the tooling.

5. The system of claim 1, wherein:
the client apparatus being configured to receive the data from the external device includes the client apparatus being configured to receive the predictive analytics from the server; and
the client apparatus being configured to display the at least a portion of the received data includes the client apparatus being configured to display the predictive analytics.

6. The system of claim 5, wherein the predictive analytics comprise a global inventory snapshot, wherein the global inventory snapshot includes a status for each of a plurality of tooling tracked by the system, and wherein the plurality of tooling includes the tooling that the sensor of the data-gathering apparatus is disposed on.

7. A computer-implemented method, comprising:
receiving, at a server, event data from a data-gathering apparatus, wherein the event data is based on one or more events detected by a sensor of the data-gathering apparatus, wherein the sensor is disposed on a tooling;
receiving, at the server, tooling data from a tool record database, wherein the tooling data includes data about the tooling that the sensor of the data-gathering apparatus is disposed on; and
generating, via the server, predictive analytics based on the received event data and tooling data,
wherein receiving the tooling data comprises receiving, from the tool record database, at least one of:
a maintenance history for the tooling;
a number of breakdowns of the tooling;
cavity data of the tooling;
warranty information for the tooling; or
a tool classification of the tooling, and
wherein generating, via the server, the predictive analytics comprises generating a predicted life remaining for the tooling based on a cycle count of the tooling, a maintenance history of the tooling, and warranty data of the tooling.

8. A computer-implemented method, comprising:
receiving, at a server, event data from a data-gathering apparatus, wherein the event data is based on one or more events detected by a sensor of the data-gathering apparatus, wherein the sensor is disposed on a tooling;
receiving, at the server, tooling data from a tool record database, wherein the tooling data includes data about the tooling that the sensor of the data-gathering apparatus is disposed on; and
generating, via the server, predictive analytics based on the received event data and tooling data,
wherein receiving the tooling data comprises receiving, from the tool record database, at least one of:
a maintenance history for the tooling;
a number of breakdowns of the tooling;
cavity data of the tooling;
warranty information for the tooling; or
a tool classification of the tooling, and
wherein generating, via the server, the predictive analytics comprises generating a current tooling condition for the tooling based on a cycle count of the tooling, a maintenance history of the tooling, and a predicted life remaining for the tooling.

9. A system, comprising:
a data-gathering apparatus, comprising
a sensor disposed on a tooling, wherein the sensor is configured to detect one or more events produced by the tooling, and
a data store configured to store event data, wherein the event data is based on the one or more detected events;
a client apparatus configured to
receive user input,
communicate the user input to an external device,
receive data from the external device, and
display at least a portion of the received data on a display of the client apparatus; and
a server in data communication with the data-gathering apparatus and the client apparatus, wherein the server is configured to
receive the event data,
process the event data to generate one or more predictive analytics based on the event data, and
send at least a portion of the predictive analytics to the client apparatus;
a tool record database in data communication with the server, wherein the tool record database is configured to store tooling data; and
send the tooling data to the server,
wherein the server being configured to process the event data to generate the one or more predictive analytics includes the server being configured to process the tooling data and the event data to generate the one or more predictive analytics,
wherein the server being configured to process the tooling data and the event data comprises the server calculating the predictive analytics based on the tooling data and the event data,
wherein the tooling data includes
a maintenance history of the tooling,
cavity data of the tooling, and
a predictive life remaining for the tooling;
the event data includes a cycle count of the tooling; and
the predictive analytics include a risk index value for the tooling.

10. A system, comprising:
a data-gathering apparatus, comprising
a sensor disposed on a tooling, wherein the sensor is configured to detect one or more events produced by the tooling, and a data store configured to store event data, wherein the event data is based on the one or more detected events;

a client apparatus configured to
receive user input,
communicate the user input to an external device,
receive data from the external device, and
display at least a portion of the received data on a display of the client apparatus; and a server in data communication with the data-gathering apparatus and the client apparatus, wherein the server is configured to
receive the event data,
process the event data to generate one or more predictive analytics based on the event data, and
send at least a portion of the predictive analytics to the client apparatus;

a tool record database in data communication with the server, wherein the tool record database is configured to store tooling data; and
send the tooling data to the server, wherein the server being configured to process the event data to generate the one or more predictive analytics includes the server being configured to process the tooling data and the event data to generate the one or more predictive analytics, wherein the server being configured to process the tooling data and the event data comprises the server calculating the predictive analytics based on the tooling data and the event data, wherein the tooling data includes
tooling manual data for the tooling, and
a use history for the tooling;

the event data includes a cycle count of the tooling; and the predictive analytics include at least one of
a calendar date for maintenance for the tooling, or
a cycle count for maintenance for the tooling.

* * * * *